Patented May 2, 1939

2,156,307

UNITED STATES PATENT OFFICE 2,156,307

WELDING HARDENABLE STEELS

Franz Rapatz, Buderich-Dusseldorf, Germany, assignor to Gebr. Bohler & Co. Aktiengesellschaft Wien, Vienna, Germany No Drawing. Application March 19, 1937, Serial No. 131,859. In Germany April 1, 1935

8 Claims. (Cl. 219—8)

This invention relates to welding rods, and more specifically to a new and useful welding rod for forming strong fusion-deposited welds in articles comprising contiguous members of hardenable ferritic steel.

Hardenable steel is a very difficult material to weld by fusion-deposition methods, because the heating conditions of welding cause stresses which embrittle, weaken, and frequently crack the hardenable steel. An object of this invention is to provide strong and ductile welds in hardenable steel, and to provide a method and a welding rod for producing such welds. This object is attained, according to the invention, by the use of a welding rod composed of certain austenitic steels.

It would be expected that austenitic steels would not be suitable for welding hardenable steels, because dilution effects at the transition layer between the austenitic filler material and the pearlitic or other ferritic-type base material would be expected to form a brittle martensitic material. I have found, however, that by using an excess of austenite-stabilizing alloying element in welding rod, a strong and ductile joint may successfully be made.

I have further found that an excess of at least 2%, and preferably at least 4%, of nickel or manganese, or both, over the amount required to produce a permanently austenitic structure under all ordinary rates of cooling encountered in welding practice, is required to attain the objects of the invention.

The minimum amounts of the austenite-stabilizing elements required depend, of course, upon the amounts of carbon and other elements present. The minimum amounts may readily be determined, however, by consulting the known phase diagrams, such as those shown on pages 68, 85, and 116 of "Edelstähle", second edition, by F. Rapatz, and on pages 722 and 751 of "The Making, Shaping, and Treating of Steel", fourth edition, by J. M. Camp and C. B. Francis.

I prefer to use steels containing no more than 0.4% carbon, and the very best results are usually attained when the carbon content does not exceed 0.2%. I also prefer to use steels containing from 2% to 35% chromium, the range of 16% to 30% being especially useful. Further, although the austenitic chromium-nickel steels may be used, I prefer to use the chromium-manganese, chromium-manganese-copper, chromium-manganese-nickel, and chromium-manganese-nickel-copper steels described, for instances, on pages 497 to 501 of "The Book of Stainless Steels", second edition, edited by E. E. Thum and published by The American Society for Testing Metals. Although the phase diagrams have not been determined for some of these complex austenitic steels, simple trial will suffice to determine the exact composition required to meet the conditions disclosed above.

Although the known phase diagrams mentioned above would indicate that dilution effects occurring during welding would produce a brittle martensite or austenite-martensite structure at the transition zone, I have found, surprisingly, that a strong, non-brittle austenitic or austenitic-ferric structure is obtained, and it is chiefly to this fact that I attribute the valuable benefits attained according to the invention.

I claim:

1. Austenitic steel welding rod for fusion-deposition welding hardenable ferritic steel members by a weld substantially free from martensite containing carbon in an amount not exceeding 0.4% and containing at least one metal of the group consisting of nickel and manganese, the sum of the nickel and manganese being at least 2% greater than that required to make the steel completely austenitic.

2. Austenitic steel welding rod for fusion-deposition welding hardenable ferritic steel members by a weld substantially free from martensite containing carbon in an amount not exceeding 0.2% and containing at least one metal of the group consisting of nickel and manganese, the sum of the nickel and manganese being at least 4% greater than that required to make the steel completely austenitic.

3. Austenitic steel welding rod for fusion-deposition welding hardenable ferritic steel members by a weld substantially free from martensite containing 2% to 35% chromium, carbon in an amount not exceeding 0.2% and containing at least one metal of the group consisting of nickel and manganese, the sum of the nickel and manganese being at least 4% greater than that required to make the steel completely austenitic.

4. Austenitic steel welding rod for fusion-deposition welding hardenable ferritic steel members by a weld substantially free from martensite containing 16% to 30% chromium, carbon in an amount not exceeding 0.2% and containing at least one metal of the group consisting of nickel and manganese, the sum of the nickel and manganese being at least 4% greater than that required to make the steel completely austenitic.

5. Article comprising at least two contiguous members of hardenable ferritic steel united by a fusion-deposited weld composed of austenitic steel containing carbon in an amount not exceeding 0.4% and containing at least one metal of the group consisting of nickel and manganese, the sum of the nickel and manganese being at least 2% greater than that required to make the steel completely austenitic; said weld and the transition zone between the weld and the said members being substantially free from martensite.

6. Article comprising at least two contiguous members of hardenable ferritic steel united by a fusion-deposited weld composed of austenitic steel containing carbon in an amount not exceeding 0.2% and containing at least one metal of the group consisting of nickel and manganese, the sum of the nickel and manganese being at least 4% greater than that required to make the steel completely austenitic; said weld and the transition zone between the weld and the said members being substantially free from martensite.

7. Article comprising at least two contiguous members of hardenable ferritic steel united by a fusion-deposited weld composed of austenitic steel containing 2% to 35% chromium, carbon in an amount not exceeding 0.2% and containing at least one metal of the group consisting of nickel and manganese, the sum of the nickel and manganese being at least 4% greater than that required to make the steel completely austenitic; said weld and the transition zone between the weld and the said members being substantially free from martensite.

8. Article comprising at least two contiguous members of hardenable ferritic steel united by a fusion-deposited weld composed of austenitic steel containing 16% to 30% chromium, carbon in an amount not exceeding 0.2% and containing at least one metal of the group consisting of nickel and manganese, the sum of the nickel and manganese being at least 4% greater than that required to make the steel completely austenitic; said weld and the transition zone between the weld and the said members being substantially free from martensite.

FRANZ RAPATZ.